United States Patent [19]

Ito

[11] 3,997,064
[45] Dec. 14, 1976

[54] LOADING DEVICE
[75] Inventor: Kiyoshi Ito, Chiba, Japan
[73] Assignee: Kabushiki Kaisha Daini Seikosha, Japan
[22] Filed: Apr. 2, 1975
[21] Appl. No.: 564,298

[30] Foreign Application Priority Data
Apr. 2, 1974  Japan ............................. 49-37249
Apr. 2, 1974  Japan ............................. 49-37250

[52] U.S. Cl. .......................... 214/1 BB; 214/1 BD; 214/1 BT; 214/1 BV
[51] Int. Cl.² ......................................... B65G 61/00
[58] Field of Search ............... 214/1 B, 1 BS, 1 BB, 214/1 BT, 1 BC, 1 BH, 1 BD, 1 BV, 146.5, 148; 198/20 R, 27

[56] References Cited
UNITED STATES PATENTS

| 2,323,088 | 6/1943 | Foner ............................. 214/148 |
| 3,884,365 | 5/1975 | Thomson ..................... 214/146.5 X |
| 3,910,423 | 10/1975 | Killian et al. ................... 214/1 BB |

FOREIGN PATENTS OR APPLICATIONS 874,948  8/1961  United Kingdom ............. 214/1 BC Primary Examiner—Frank E. Werner
Attorney, Agent, or Firm—Robert E. Burns; Emmanuel J. Lobato; Bruce L. Adams

[57] ABSTRACT

A loading device has a loading arm swingable about a swing axis and movable parallel to the swing axis, so as to pick up a desired number of works from a work supplying spot. A pick-up head is mounted on the loading arm and moves therewith through a series of upward, swivel and downward movements to transport the work. A mobile frame moves together with the loading arm and is provided with stoppers each of which cooperates with a stopper on the loading arm to stop and angularly position the swingable loading arm. A pair of switching elements are mounted on the mobile frame for detecting the loading arm height which is determined by the work loading condition.

4 Claims, 5 Drawing Figures

LOADING DEVICE

BACKGROUND OF THE INVENTION

The present invention relates to a loading device having a loading arm movable in the vertical direction.

Loading devices having swingable loading arms movable in the vertical direction are generally so constituted that a loading arm takes up a workpiece from a workpiece supplying spot by a pick-up mechanism disposed on the end portion of the arm, then the loading arm swings through a predetermined angle and sets the workpiece on a loading spot.

Therefore, using such a loading device of swing type, especially for loading a small workpiece, the fixing of the workpiece supplying location and the loading location requires a higher degree of accuracy. For ensuring higher position fixing accuracy, the loading arm is commonly located at the swivel ends thereof in such a manner that a stopper on the arm swings into contact with a second stopper secured on the base frame to thereby accurately fix the end positions.

The position fixing of this fixed-stopper-contact method is indeed more excellent in accuracy, lasting quality and reliability than that of using either a cam mechanism or electroservo mechanism.

But, in this position fixing method, the loading arm moves vertically just at a located swivel position thereof so that pressure contact between the pair of coacting stoppers, one being on the loading arm and the other on the fixed base frame must be maintained during the vertical movement of the arm. That is, while the loading arm moves vertically, the stopper on the arm is rubbing along the stopper face of the base frame with some friction. Accordingly, the loading arm needs a strong force for its vertical movement and therefore is unable to move smoothly and speedily. In addition, it is inevitable for the stoppers to be worn away, so that good maintenance of the locating accuracy could not be expected.

Furthermore, in the automatic loading of plate-like workpieces one by one on a die of a press machine, if two or more workpieces are loaded in piles due to a misoperation of the loading device, the pressing operation exerts an overload upon the press machine which can damage the die set. Similarly, if the die set is not occupied by a workpiece during the pressing operation, the die set is apt to be damaged and its life shortened.

Therefore, it is usual in automatic loading devices for press machines to provide a work disorder loading detector to detect and discriminate normal work placing from abnormal and to stop the press machine when an abnormal loading is detected.

A photo-electric detector used in the prior art detects whether work loading is in proper condition or not, but such a detector can not detect loaded works in piles. An air-jet sensor also detects only whether the work is spaced on the die or not. All of the conventional detectors can not detect when the work is in disorder on the die.

BRIEF SUMMARY OF THE INVENTION

It is an object of the present invention to provide a loading device having a swingable loading arm which has precise swivel stopping means for the loading arm and which has a longer life and higher accuracy than prior art devices.

It is another object of the invention to provide a loading device having a swingable loading arm and in which the loading arm is axially moved smoothly with a light driving force.

It is still another object of the invention to provide a loading device having a swingable loading arm and which is capable of detecting loading disorder so as to be suitable for loading plate-like works.

These and other objects have been attained by the loading device which comprises a loading arm swingable and movable parallel to the swing axis thereof and provided with a pickup head for holding works thereon, a mobile frame movable together with the head frame, one or more stoppers mounted on the mobile frame, each spaced respectively corresponding to stoppers mounted on the loading arm for stopping the loading arm swivel at predetermined fixed end positions, moving means to move the loading arm together with the mobile frame, and swinging means to swing the arm to press a stopper of the arm on to a stopper of the mobile frame.

BRIEF DESSCRIPTION OF THE DRAWINGS

DETAILED DESCRIPTION OF THE INVENTION

Figure 1:
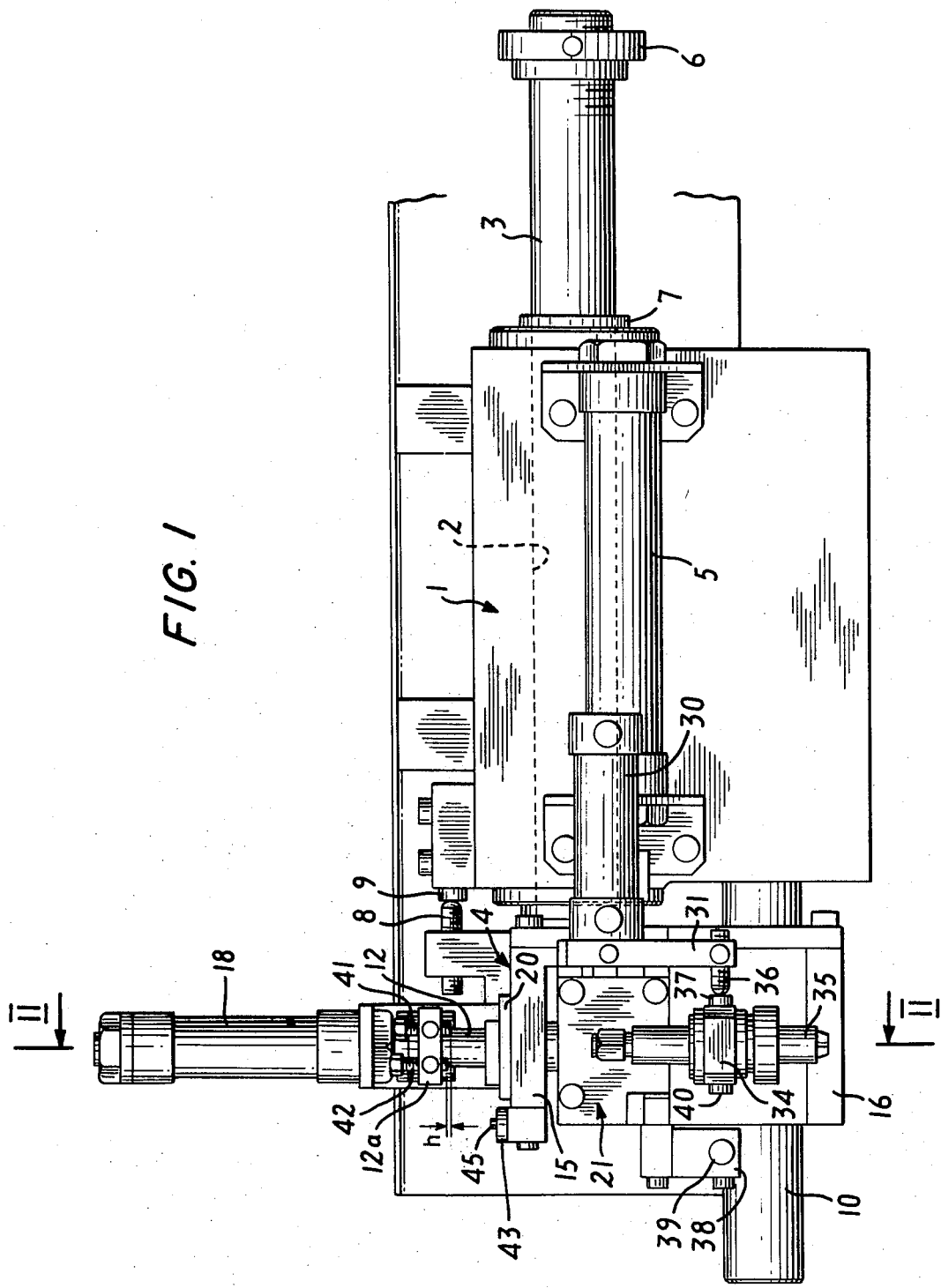
FIG. 1 is a side view showing a loading device according to the invention.

Referring now to an embodiment of the invention shown in the drawings, FIG. 1 is a side view of a loading device according to the invention. Numeral 1 designates a fixed oblong frame having a horizontal hollow or bore 2 in its longitudinal direction. A reciprocating shaft 3 is slidably supported in the bore 2. Numeral 4 designates a head frame securely fixed on an end of the shaft 3. Said head frame 4 is reciprocated together with the shaft 3 by an air cylinder 5 which is mounted on said oblong frame 1. The most advanced positions of the shaft 3 is determined by means of the contact of a stopper 6 on the rear portion of the shaft 3 and a stopper 7 on the fixed oblong frame 1, and the most retracted position is determined by means of the contact of a screw stopper 8 on the head frame 4 and a stopper 9 on the oblong frame 1.

Numeral 10 is a guide bar protruded forward from the front end of said oblong frame 1, spaced below the reciprocating shaft 3, and penetrating through a hollow or bore 11 (shown in FIG. 2) formed in said head frame 4. By such a construction, the bar 10 keeps the head frame 4 from swinging around the reciprocating shaft axis.

Figure 2:
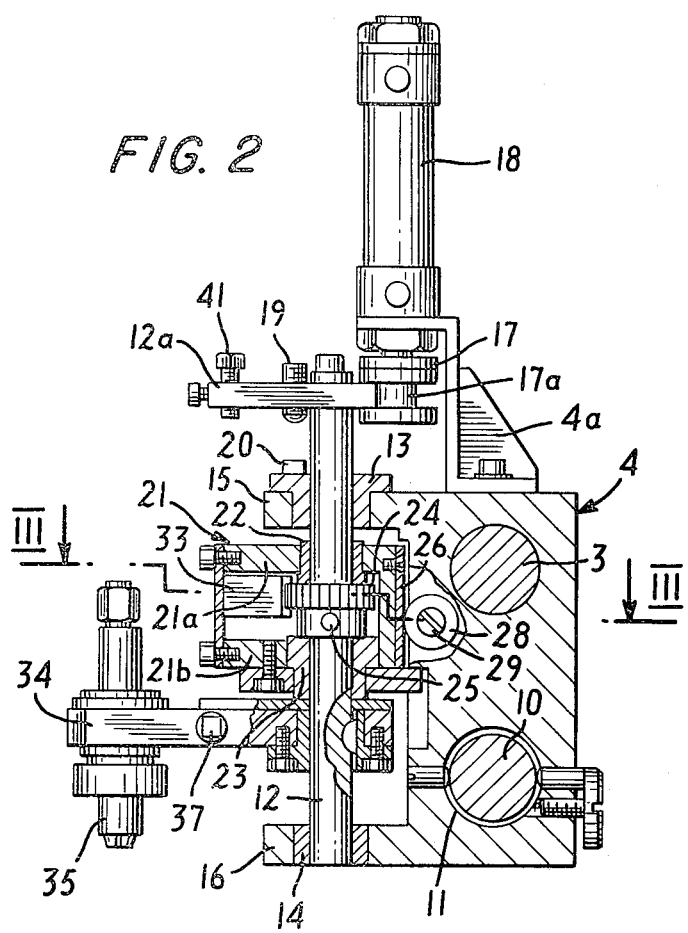
FIG. 2 is a sectional view taken on line II — II of FIG. 1 showing the loading head portion of the loading device.

Numeral 12 is a vertical shaft slidably and rotatably supported with bearings 13 and 14 of an upper arm 15 and a lower arm 16 which are protruded from said head frame 4 as shown in FIG. 2. Said vertical shaft 12 is connected at the top end portion with a connecting bracket 12a which is further axially connected with a member 17a fixed on the piston rod 17 of a vertical air cylinder 18 which is mounted on the top of the head frame 4 through a bracket 4a. The air cylinder 18 effects vertical movement of the shaft 12 and the lowermost position thereof is determined by a screw stopper 19 mounted on the vertical shaft top end and which comes into contact with a stopper plate 20 on the upper arm 15.

Figure 3:
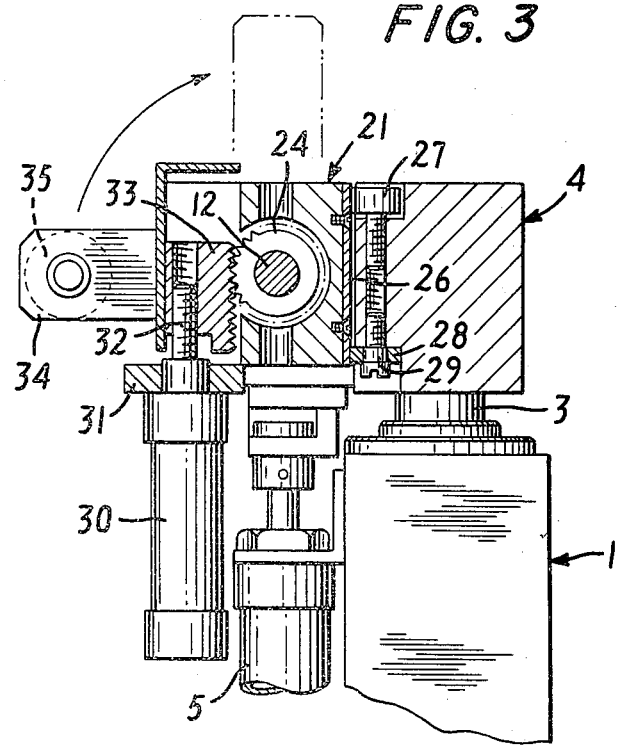
FIG. 3 is a sectional view taken on line III — III of FIG. 2.

Numeral 21 designates a ]-shaped mobile frame movable in the vertical direction, which is relatively rotatably but unslidably supported by said vertical shaft 12, the vertical shaft 12 penetrating bearings 22 and 23 each mounted on the upper and lower portions 21a and 21b of the mobile frame 21. A pinion 24 is spaced between the upper and lower portions 21a and 21b and is securely fixed on the vertical shaft 12 with a pin 25 which penetrates through the shaft 12 and the pinion 24. Said ]-shaped mobile frame 21 has on one side thereof a guiding plate 26, as shown in FIG. 3, which is kept in contact with rollers 27 and 28 mounted on the head frame 4 so that the mobile frame 21, which is movable vertically together with the vertical shaft 12, is always in nonrotatable relation around the shaft 12 relative to the head frame 4. One of said rollers 28 is pivotally mounted on an eccentric shaft 29 attached on the head frame 4, and said eccentric shaft 29 is angularly adjusted so that the roller 28 properly presses the guiding plate 26 thereby eliminating any gap between the guiding plate 26 and the pair of the rollers 27 and 28.

Numeral 30 designates an air cylinder mounted on a plate 31 which is securely fixed on a side of the mobile frame 21. The piston rod 32 of the air cylinder 30 is connected to a rack 33 which meshes with said pinion 24 so that the air cylinder 30 drives the vertical shaft 12 to swing.

Numeral 34 designates a swingable loading arm spaced below the ]-shaped mobile frame 21. An end of the loading arm 34 is securely fixed on the vertical shaft 12, so that the arm 34 swings together with the shaft 12. On the other end of the loading arm 34 is mounted a pick-up head 35 for picking up a workpiece.

Said pick-up head 35 has a kind of chuck or gripper including air-operated jaws and/or vacuum chuck to hold any desired number or desired kind of workpiece and such is not illustrated in the drawings as it is well known and in the act and is not needed to understand the invention.

A screw stopper 36 is adjustably screwed on said plate 31 for setting the angular end position of the arm swing stroke due to contact of the screw stopper 36 with a stopper 37 fixed at a side of the arm 34.

Further, a bracket 38 is fixed on the front side of said ]-shaped mobile frame 21, and a screw stopper 39 is also adjustably screwed on said bracket 38, being located at a proper angular position, for example, of 90 degrees, from the screw stopper 36. The other end position of the swing stroke of the loading arm 34 is determined by the screw stopper 39 making contact with a stopper 40 which is fixed at the opposite side of the arm 34 to the stopper 37. Numerals 41 and 42 designate height detecting bolts each screwed on said connecting plate 12a, a first bolt 41 is set to be so spaced as the bottom thereof is lower by a length h equal to the sum of thickness of work plates (not shown) to be placed on the loading location, for example, to thickness of a work plate than that of a second screw 42, as shown in FIG. 1.

Figure 4:
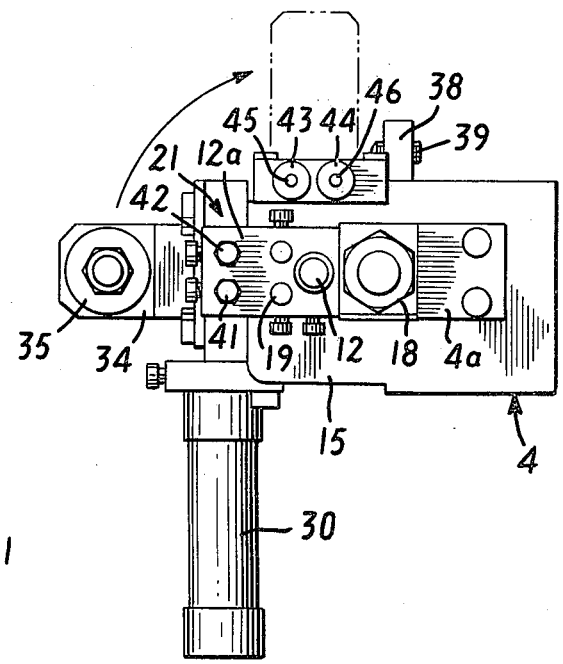
FIG. 4 is a plan view of the head shown in FIG. 2

Numerals 43 and 44 designate micro-switches so mounted on said fixed head frame 4, as is shown in FIG. 4, that the micro-switches 43 and 44 are respectively spaced corresponding to the location of the bolts 41 and 42 when the bolts 41 and 42 together with the loading arm 34 are placed at the swivel end position for work loading. Switch actuators 45 and 46 respectively equipped on the micro-switches 43 and 44 are spaced at the same height so that when the loading arm is moved downward to the loading location, the combinations of on-off operations of the switches indicate whether the work loading is within acceptable limits or not. That is, the switch operating condition in which both of the switches 43 and 44 still stay off or both the switches are switched on, is perceived as unacceptable work loading whereupon the loading device and the machine to which the workpieces are loaded, are automatically stopped. While, the condition in which only the microswitch 43 is switched on, is perceived as normal work loading so that the machinery continues operating.

Ther operation of above mentioned loading device will be described hereinafter.

At an initial step of the loading device to pick a workpiece up, the head frame 4 is positioned at the most retracted location and the loading arm 34 is stopped with the pick-up head 35 over a workpiece supplying location, the arm at this state is illustrated in a continuous Line in FIG. 3, the air cylinder 30 is forcing the loading arm 34, through the rack 33 and the pinion 24, to swing counterclockwise in FIG. 3 and to press the stopper 37 onto the screw stopper 36 so that the loading arm 34 is just positioned so that the pick-up head 35 is at a proper location suitable for holding a workpiece A in the first supplying station.

In this state, the cylinder 18 receives a work loading direction signal and is accordingly actuated to propel its piston rod 17 downward, thereby the vertical shaft 12 is moved downward together with the loading arm 34 and the mobile frame 21. During the downward movement, the guiding plate 26 of the frame 21 is kept in contact with the rollers 27 and 28.

As a result, the stopper 37 on the loading arm 34 and the screw stopper 36 on the frame 21 are moved downward as a unit, being kept in static contact with each other.

This downward movement of the vertical shaft 12 is stopped by the contact of the screw stopper 19 of the vertical shaft 12 with the stopper plate 20 of the head frame 4, the pick-up head 35 holding the workpiece at the supplying station.

After the workpiece holding operation, the air cylinder 18 is reversely actuated to propel the piston rod 17 upward together with the vertical shaft 12, the loading arm 34 and the mobile frame 21, keeping the stoppers 36 and 37 also in static contact with each other.

The loading arm 34 and the mobile frame 21 are thus returned to their initial location.

Next, the air cylinder 5 is actuated to propel the reciprocating shaft 3 forward shifting the head frame 4 from the first work supplying location to the second work supplying location. A similar operation is there preformed to hold a workpiece B atop the workpiece A in the pick-up head 35.

Then, the air cylinder 30 is reversely actuated to propel its piston rod 32 forward, swinging the loading arm 34 clockwise through the rack 33 and the pinion 24 together with the vertical shaft 12.

With a predetermined swivel, for example, of 90 degrees, the loading arm 34 reaches the location where the stopper 40 on the arm 34 comes in contact and presses against the screw stopper 39, thereby, the loading arm swivel is stopped and the arm 34 is located over the workpiece loading station, the arm in this state being illustrated in a chain line in FIG. 3.

At this state, the air cylinder 18 is again actuated so as to move the vertical shaft 12 downward together with the loading arm 34 and the mobile frame 21, keeping the stopper 40 of the swing arm 34 and the screw stopper 39 of the mobile frame 21 in static contact with each other.

When the loading arm 34 is moved down with its shaft 12 till the workpieces held in the pick-up head 35 of the arm 34 arrives at and is placed on the work loading station (not shown in the drawings), the downward movement is stopped and the work is released from the pick-up head 35.

When the pick-up head 35 has placed a set of workpieces on the loading station, only the first bolt 41 is pushing on the actuator 46 of the first micro-switch 43, thereby, it is detected that the loading operation is normal, permitting the machinery to operate without interruption.

However, when the pick-up head 35 has placed more than a predetermined number of workpieces two or more in this case, in piles on the loading station, such a malfunction or misoperation is detected by both of the bolts 41 and 42 not touching the actuators 45 and 46 of the micro-switches 43 and 44. As a consequence, the vertical shaft 12 stays at a higher position by an amount equal to the workpiece thickness from the normal position, so that both the micro-switches are not actuated and it is detected that the loading operation is wrong, thereby stopping the machinery operation.

When no workpiece is placed on the loading station on account of work pick-up miss or work dropping from the pick-up head during transporting, the vertical shaft 12 stops at a lower position than normal and both of the bolts 41 and 42 press the actuators 45 and 46 of both the micro-switches 43 and 44. Accordingly, it is detected that the loading operation is also wrong, thereby stopping the machinery operation. In this case, as the loading station is empty, the loading device may be operated leaving the machine stopped.

After the loading operation, the loading arm 34 is returned upward together with the frame 21, and then, the loading arm 34 is swung counterclockwise till its stopper 37 comes into contact with the screw stopper 36 and is stopped, the reciprocating shaft 3 being returned back.

In the above embodiment, micro-switches are used for switching elements to discriminate work loading disorder and normal conditions. Other switching elements such as metal-contact switches or contactless switches may be also used in this invention.

Figure 5:
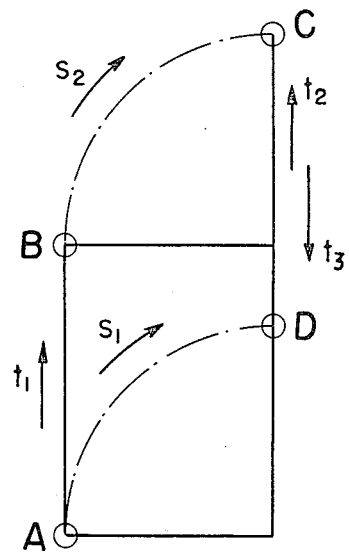
FIG. 5 is a simplified operational diagrammatic plan view of the loading arm to better illustrate the sequence of operations thereof.

The operational sequence (a work picking-up at A - head advancing $t_1$ - another work picking-up at B - arm swivel $s$ - loading at C in FIG. 5), described in the above embodiment may as well be changed to other sequences, such as picking-up two workpieces at A station - arm swivel $s$, - head advance $t_2$ - loading at C and such a sequence is suitable for loading in a narrow space, or picking-up a desired number of works at A - head advance $t_1$ - picking-up another work at B - arm swivel $s_2$ -loading at C - head retiring $t_3$ - processed work ejecting at D.

What is claimed is:

1. A loading device comprising: a loading arm swingable and movable parallel to the swing axis thereof and provided with a pick-up head for holding works thereon, a mobile frame movable together with said loading arm but unswingably supported by a head frame, a first group of one or more stoppers mounted on said mobile frame, each of said stoppers being spaced in a location corresponding to one of another group of stoppers, said another group of stoppers being equal in number to said first group of stoppers and mounted on said loading arm at predetermined angular locations around the swing axis thereof, moving means to move said loading arm together with the mobile frame, and swinging means to swing said loading arm and to thus press one of the stoppers on the arm against the corresponding stopper on the mobile frame during the arm swivel stroke, whereby the stop position of the loading arm is determined for work picking up or placing.

2. A loading device claimed in claim 1, wherein each stopper of said first group has adjusting means to adjust the operating surface thereof.

3. A loading device claimed in claim 1, further comprising means to reciprocate said head frame along a given axis to accordingly move said loading arm and said mobile frame.

4. A loading device claimed in claim 1, wherein said mobile frame is provided with a pair of switching elements for detecting the loading arm position in the moving direction thereof, said elements being spaced respectively corresponding to a pair of actuating members mounted on said loading arm which is angularly positioned at the loading location by the stopper pressing action, whereby a combination of on-off operations of said switching elements is selectively determined by the loading arm position in the moving direction thereof so that a detecting signal of the loaded work condition is obtained.

* * * * *